United States Patent
Cho et al.

(10) Patent No.: US 9,948,857 B2
(45) Date of Patent: Apr. 17, 2018

(54) METHOD AND DEVICE FOR GENERATING IMAGES

(71) Applicant: SAMSUNG ELECTRONICS CO., LTD., Suwon-si, Gyeonggi-do (KR)

(72) Inventors: Sung-hyun Cho, Suwon-si (KR); Hee-chul Han, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 45 days.

(21) Appl. No.: 15/244,242

(22) Filed: Aug. 23, 2016

(65) Prior Publication Data
US 2017/0118407 A1 Apr. 27, 2017

Related U.S. Application Data

(60) Provisional application No. 62/244,887, filed on Oct. 22, 2015.

(30) Foreign Application Priority Data

Mar. 15, 2016 (KR) .................... 10-2016-0030949

(51) Int. Cl.
*H04N 5/232* (2006.01)
*H04N 5/378* (2011.01)
*H04N 5/225* (2006.01)
*H04N 9/64* (2006.01)

(52) U.S. Cl.
CPC ....... *H04N 5/23232* (2013.01); *H04N 5/2258* (2013.01); *H04N 5/378* (2013.01); *H04N 9/646* (2013.01)

(58) Field of Classification Search
None
See application file for complete search history.

(56) References Cited

U.S. PATENT DOCUMENTS

| | | | |
|---|---|---|---|
| 8,115,825 B2 | 2/2012 | Culbert et al. | |
| 8,681,250 B2 | 3/2014 | Culbert et al. | |
| 9,473,708 B1* | 10/2016 | D'Amico | H04N 5/265 |
| 2013/0016251 A1* | 1/2013 | Ogasahara | H04N 5/2258 348/238 |
| 2013/0229544 A1* | 9/2013 | Bando | H04N 9/093 348/222.1 |
| 2013/0250109 A1* | 9/2013 | Yokota | H04N 5/2254 348/148 |
| 2014/0009634 A1* | 1/2014 | Hiwada | H04N 5/225 348/222.1 |

(Continued)

*Primary Examiner* — Shahbaz Nazrul
(74) *Attorney, Agent, or Firm* — Nixon & Vanderhye, P.C.

(57) ABSTRACT

Disclosed are devices and methods for generating an image. A device according to an aspect of an example embodiment includes: a first camera configured to acquire a first black-and-white image; a second camera configured to acquire a first color image; a first electronic circuit configured to generate a second black-and-white image using the first color image; a second electronic circuit configured to determine information representing positional relationships between pixels in the first black-and-white image and pixels in the second black-and-white image; and a third electronic circuit configured to generate a third black-and-white image based on the first black-and-white image, the second black-and-white image, and the determined information.

19 Claims, 11 Drawing Sheets

(56) References Cited

U.S. PATENT DOCUMENTS

| | | | |
|---|---|---|---|
| 2015/0294167 A1* | 10/2015 | Zhang | G06K 9/00825 |
| | | | 382/103 |
| 2016/0050354 A1* | 2/2016 | Musatenko | H04N 5/2355 |
| | | | 348/229.1 |
| 2016/0080626 A1* | 3/2016 | Kovtun | H04N 5/2355 |
| | | | 348/218.1 |
| 2017/0085850 A1* | 3/2017 | Yamaguchi | G06T 3/4015 |
| 2017/0245744 A1* | 8/2017 | McDowall | A61B 1/051 |

* cited by examiner

METHOD AND DEVICE FOR GENERATING IMAGES

CROSS-REFERENCE TO RELATED APPLICATIONS

This application is based on and claims priority under 35 U.S.C. § 119 to U.S. Provisional Application No. 62/244,887, filed on Oct. 22, 2015, in the US Patent Office and Korean Patent Application No. 10-2016-0030949, filed on Mar. 15, 2016, in the Korean Intellectual Property Office, the disclosures of which are incorporated by reference herein in their entireties.

BACKGROUND

1. Field

The present disclosure relates to a method and apparatus for generating images.

2. Description of Related Art

As camera-equipped mobile devices such as smartphones become more popular, the use of a camera in a smartphone, rather than a digital single lens reflex (DSLR) camera or a general digital camera, to photograph an object is increasing. However, the size or thickness of the camera in the smartphone is limited by the size or thickness of the smartphone itself. Accordingly, the camera in the smartphone has to employ an image sensor and lenses smaller than those of the DSLR camera or the general digital camera, which results in lower image quality. As demand for thinner and lighter mobile devices increases, the necessity for technologies capable of generating high quality images by using thin smartphones is also increasing.

SUMMARY

Devices and methods of generating an image are provided.

Also, a non-transitory computer-readable storage medium that stores program instructions for performing the method is provided.

The objects of example embodiments are not limited thereto and other objects may be implied in the example embodiments described below.

A device according to an example aspect of the disclosure includes: a first camera configured to acquire a first black-and-white image; a second camera configured to acquire a first color image; a first electronic circuit configured to generate a second black-and-white image using the first color image; a second electronic circuit configured to determine information representing positional relationships between pixels in the first black-and-white image and pixels in the second black-and-white image; and a third electronic circuit configured to generate a third black-and-white image based on the first black-and-white image, the second black-and-white image, and the determined information.

A method of generating an image according to an example aspect of the disclosure includes: acquiring a first black-and-white image and a first color image; generating a second black-and-white image using the first color image; determining information representing positional relationships between pixels in the first black-and-white image and pixels in the second black-and-white image; and generating a third black-and-white image based on the first black-and-white image, the second black-and-white image, and the determined information.

According to an example aspect of the disclosure, a non-transitory computer-readable storage medium having stored therein program instructions which, when executed by a computer, perform the method of generating an image is provided.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein:

FIGS. 5A and 5B are diagrams illustrating examples of image sensors in the cameras, according to an example embodiment;

DETAILED DESCRIPTION

Figure 1:
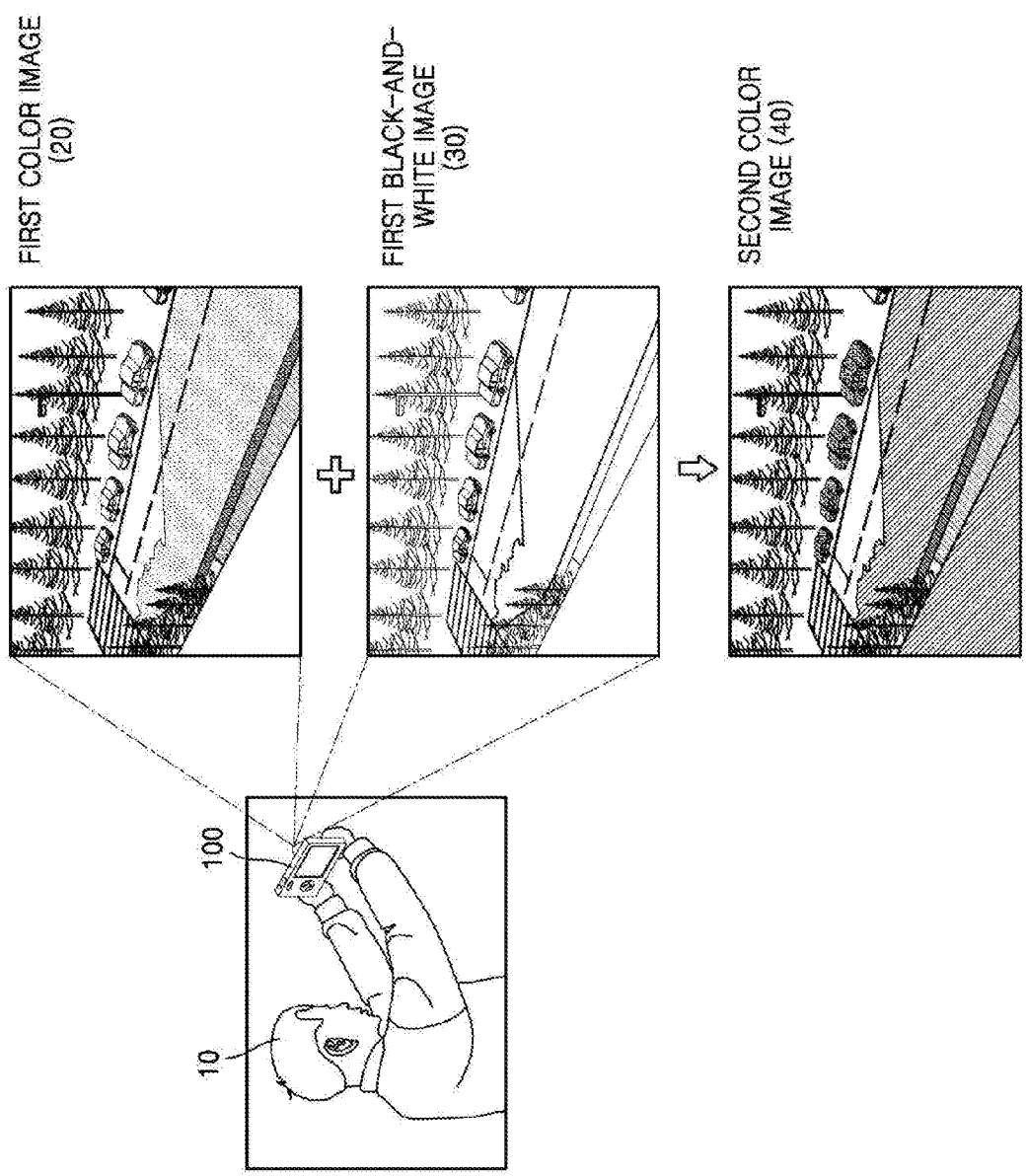
FIG. 1 is a diagram illustrating an example of generating an image, according to an example embodiment.

Reference will now be made in detail to various example embodiments, examples of which are illustrated in the accompanying drawings, wherein like reference numerals refer to like elements throughout. In this regard, the present embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms "comprises" and/or "comprising", "includes" and/or "including", or "contains" and/or "containing" when used in this specification, specify the presence of stated elements, but do not preclude the presence or addition of one or more other elements. Terminologies such as "~ unit" and "~ module" may refer to entities performing at least one function or operation, and may be implemented by a software component or hardware components such as electronic circuitry, a field-programmable gate array (FPGA) or an application-specific integrated circuit (ASIC), or a combination thereof. However, the term "unit" is not limited to software or hardware. The term "unit" may be configured to be included in an addressable storage medium or to reproduce one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units," or may be divided into additional components and "units."

FIG. 1 is a diagram illustrating an example of generating an image, according to an example embodiment. In FIG. 1, an example in which a user 10 generates an image using a device 100 is depicted.

The device 100 may include a plurality of cameras or camera modules. For example, the device 100 may include a first camera generating a black-and-white image and a second camera generating a color image. Here, the color image may refer, for example, to an image in which an object is represented by various colors, and the black-and-white image may refer, for example, to an image in which an object is represented by brightness levels between black and white.

If a photographing command signal is input by a user 10, the device 100 generates a first color image 20 and a first black-and-white image 30, which both represent an object. After generating the first color image 20, the device 100 generates a second color image 40 using the first color image 20 and the first black-and-white image 30. For example, the device 100 may generate a second black-and-white image using the first color image 20. Then, the device 100 may match the first black-and-white image 30 and the second black-and-white image to acquire information about positional relationships between pixels in the first black-and-white image 30 and pixels in the second black-and-white image. Also, the device 100 may generate a third black-and-white image based on the first black-and-white image 30, the second black-and-white image, and the acquired positional relationship information. The device 100 may generate a second color image 40 using the first color image 20 and the third black-and-white image.

In general, an image quality of a color image that is generated by a color camera including a color image sensor may be lower than that of a black-and-white image that is generated by a black-and-white camera including a black-and-white image sensor. In other words, a sharpness of an object shown in the color image may be lower than that of an object shown in the black-and-white image. Further, the color image may be more sensitive to noise compared with the black-and-white image.

In this regard, the device 100 illustrated in FIG. 1 may use the first color image 20 obtained by the first camera and the first black-and-white image 30 obtained by the second camera to generate the second color image 40, of which image quality is higher than the first color image 20.

Examples of the device 100 will now be described in greater detail below with reference to FIGS. 2 and 3.

Figure 2:
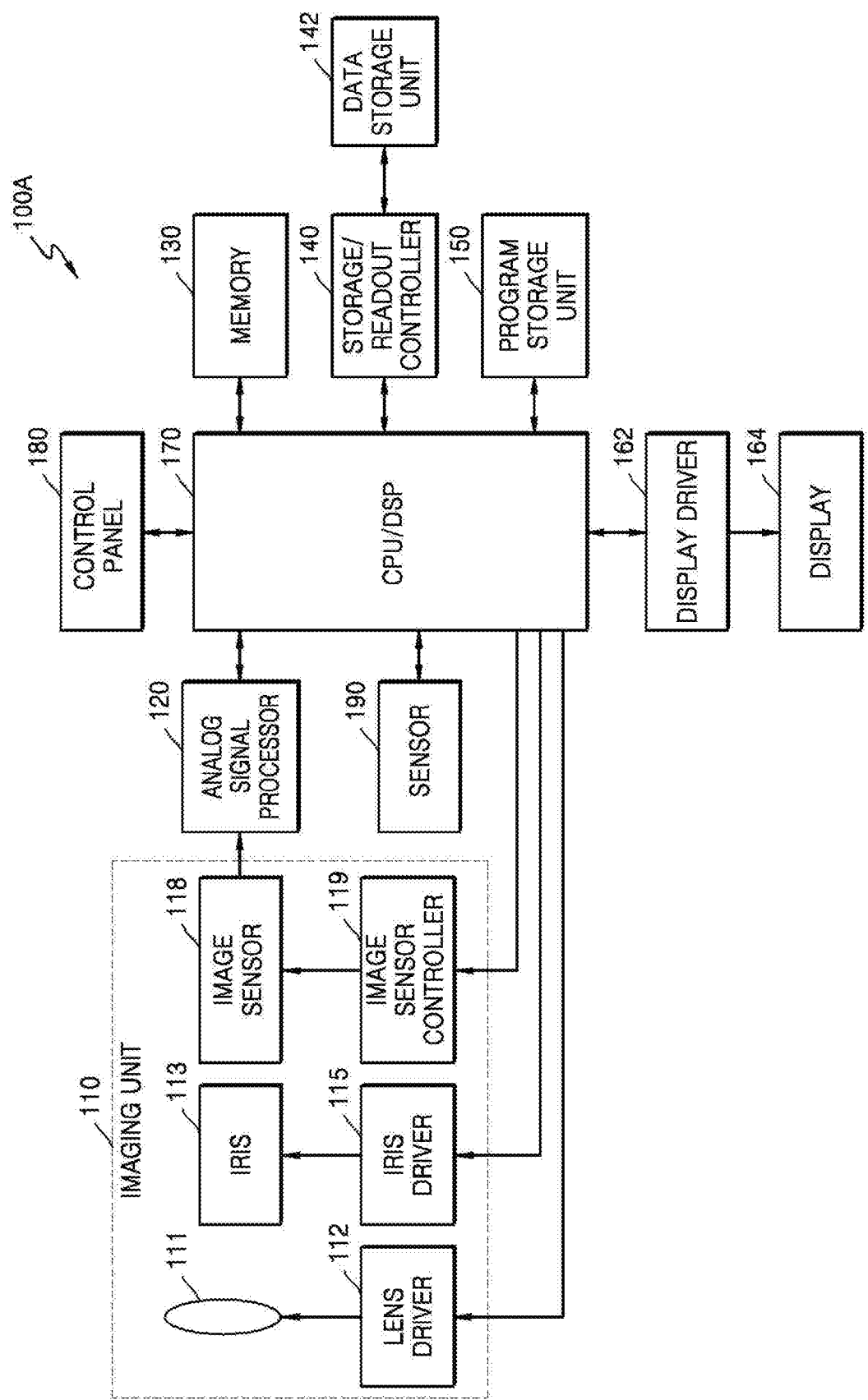
FIG. 2 is a block diagram illustrating an example device according to an example embodiment.

FIG. 2 is a block diagram illustrating an example device according to an example embodiment.

The device 100A illustrated in FIG. 2 may include an imaging unit (e.g., including various image receiving and processing circuitry) 110, an analog signal processor 120, a memory 130, a storage/readout controller 140, a data storage unit 142, a program storage unit 150, a display driver 162, a display 164, a central processing unit and digital signal processor (CPU/DSP) 170, and a control panel 180.

The overall operation of the device 100A is controlled and administered by the CPU/DSP 170. In the descriptions with reference to FIGS. 4 through 11 below, the CPU/DSP 170 will be referred to as a processor. The CPU/DSP 170 provides control signals required for the operation of the device 100A to various components of the device 100A such as a lens driver 112, an iris driver 115, an image sensor driver 119, the display driver 162, and the control panel 180.

The imaging unit 110 generates an image by converting incident light into an electrical signal, and includes various image receiving hardware and circuitry, including, for example, and without limitation, a lens 111, the lens driver 112, an iris 113, the iris driver 115, an image sensor 118, and the image sensor driver 119.

The lens 111 may include a plurality of or a plurality of sets of lenses. When the device 100A includes a plurality of lenses, each of the lenses may have a view angle different from that of the other lenses or the same view angle as the others. The position of the lens 111 may be adjusted by the lens driver 112. The lens driver 112 adjusts the position of the lens 111 according to a control signal from the CPU/DSP 170.

The iris 113 has an opening whose size is adjusted by the iris driver 115, and changes the amount of the light incident on the image sensor 118.

An optical signal passes through the lens 111 and the iris 113 and is focused on a light receiving surface of the image sensor 118 to form the image of the object. The image sensor 118 may be a charge coupled device (CCD) or a complementary metal oxide semiconductor image sensor (CIS), or the like, suitable for converting the optical signal to an electrical signal. The sensitivity or other characteristics of the image sensor 118 may be adjusted by the image sensor driver 119. The image sensor driver 119 may control the image sensor 118 according to a control signal that is generated automatically in response to a real-time image signal or input manually according to a manipulation of a user.

The exposure time of the image sensor 118 is adjusted by a shutter not shown in the drawing. The shutter may be a mechanical shutter configured to adjust the light incidence my moving a shutter plate. Also, the shutter may be an electronic shutter configured to control the exposure by supplying an electric signal to the image sensor 118.

The analog signal processor 120 performs signal processing such as noise reduction, gain adjustment, waveform shaping, and analog-to-digital conversion on an analog signal output by the image sensor 118.

The signal processed by the analog signal processor 120 may be input to the CPU/DSP 170 directly or via the memory 130. The memory 130 works as a main memory of the device 100A and temporarily stores information that is required during the operation of the CPU/DSP 170. The program storage unit 150 stores programs such as an operating system of the device 100A and application systems.

The display 164 displays operating states of the device 100A or the information of the image acquired by the device 100A. The display 164 may provide the user with visual information and/or audible information. In order to provide the visual information, the display 164 may include, for example, a liquid crystal display (LCD) panel or an organic light emitting diode (OLED) display panel.

The device 100A may include two or more displays 164. For example, the device 100A may include a display suitable for displaying a live view image containing the object being photographed and another display suitable for displaying the state of the device 100A. Meanwhile, the device 100A may include a touch screen panel configured to recognize a touch input of the user.

The display driver 162 provides the display 164 with a driving signal.

The CPU/DSP 170 processes the image signal and controls each component of the device 100A according to the image signal or an external input signal. The CPU/DSP 170 may reduce noise in the input image signal and perform image signal processing for enhancing the image quality such as gamma correction, color filter array interpolation, color matrix processing, color correction, and color enhancement. Also, the CPU/DSP 170 may compress the image data having undergone the image signal processing to generate an image file, and recover the image data from the image file. A compression format for the image data may be reciprocal or non-reciprocal. As an example of appropriate compression formats, the image data may be compressed into a Joint Photographic Experts Group (JPEG) format or a JPEG 2000 format in case of a still image. In the case of a moving picture, a plurality of frames may be compressed into a moving picture file in accordance with a Moving Picture Experts Group (MPEG) standard. The image file may be generated in accordance with, for example, an Exchangeable image file format (Exif) standard.

The image data output by the CPU/DSP 170 may be input to the storage/readout controller 140 directly or via the memory 130. The storage/readout controller 140 stores the image data into the data storage unit 142 automatically or according to a user input. Also, the storage/readout controller 140 reads out the image data from the image file stored in the data storage unit 142 and provides the image data to the display driver 162 via the memory 130 or another path, so that the image corresponding to the image data is displayed on the display 164. The data storage unit 142 may be attachable to and detachable from the device 100A. Also, the data storage unit 142 may be permanently installed in the device 100A.

Also, the CPU/DSP 170 may perform image signal processing such as blur processing, color processing, edge emphasis processing, image analysis, image recognition, and image effect processing. The image recognition may include face recognition, scene recognition, and so on. Also, the CPU/DSP 170 may perform display image processing for displaying the image on the display 164. The display image processing may include, for example, brightness adjustment, color correction, contrast adjustment, contour enhancement adjustment, screen split processing, character image generation, and image synthesis.

The CPU/DSP 170 may perform certain image signal processing for facilitating the display of the image on an external monitor when the device 100A is connected to the external monitor, and transmit the image data having undergone the image signal processing to the external monitor so that an image corresponding to the image data is displayed on the external monitor.

Also, CPU/DSP 170 may execute a program stored in the program storage unit 150 or include a separate module to generate a control signal suitable for controlling auto-focusing, zooming, focus changing, and automatic exposure correction and provide the control signal to the iris driver 115, the lens driver 112, and the image sensor controller 119 so as to control overall operations of the components of the device 100A such as the shutter and a strobe.

The control panel 180 allows the user to input control signals. The control panel 180 may include various function buttons such as a shutter release button suitable for inputting a shutter release signal that enables the image sensor 118 to be exposed to the incident light for a certain time, a power button suitable for inputting a control signal that switches the power on or off, a zoom button suitable for changing a view angle of the camera, a mode selection button, and a settings change button. The control panel 180 may be implemented by any kind of input device, such as buttons, a keyboard, a touchpad, or a remote controller, which enables the user to input the control signals.

The sensor 190 may measure a physical quantity or sense an operation state of the device 100A to convert the measured or sensed information into an electrical signal. Examples of the sensor 190 that may be included in the device 100A will be described below with reference to FIG. 3. The sensor 190 may further include a control circuit for controlling one or more sensors therein. In some embodiments, the device 100A may further include a processor for controlling the sensor 190, as a part of the CPU/DSP 170 or independently from the CPU/DSP 170, so as to control the sensor 190 when the CPU/DSP 170 is in a sleep condition.

FIG. 2 illustrates an example of the configuration of the device 100A essential for photographing, but the configuration of the device 100A is not limited to that illustrated in FIG. 2.

Figure 3:
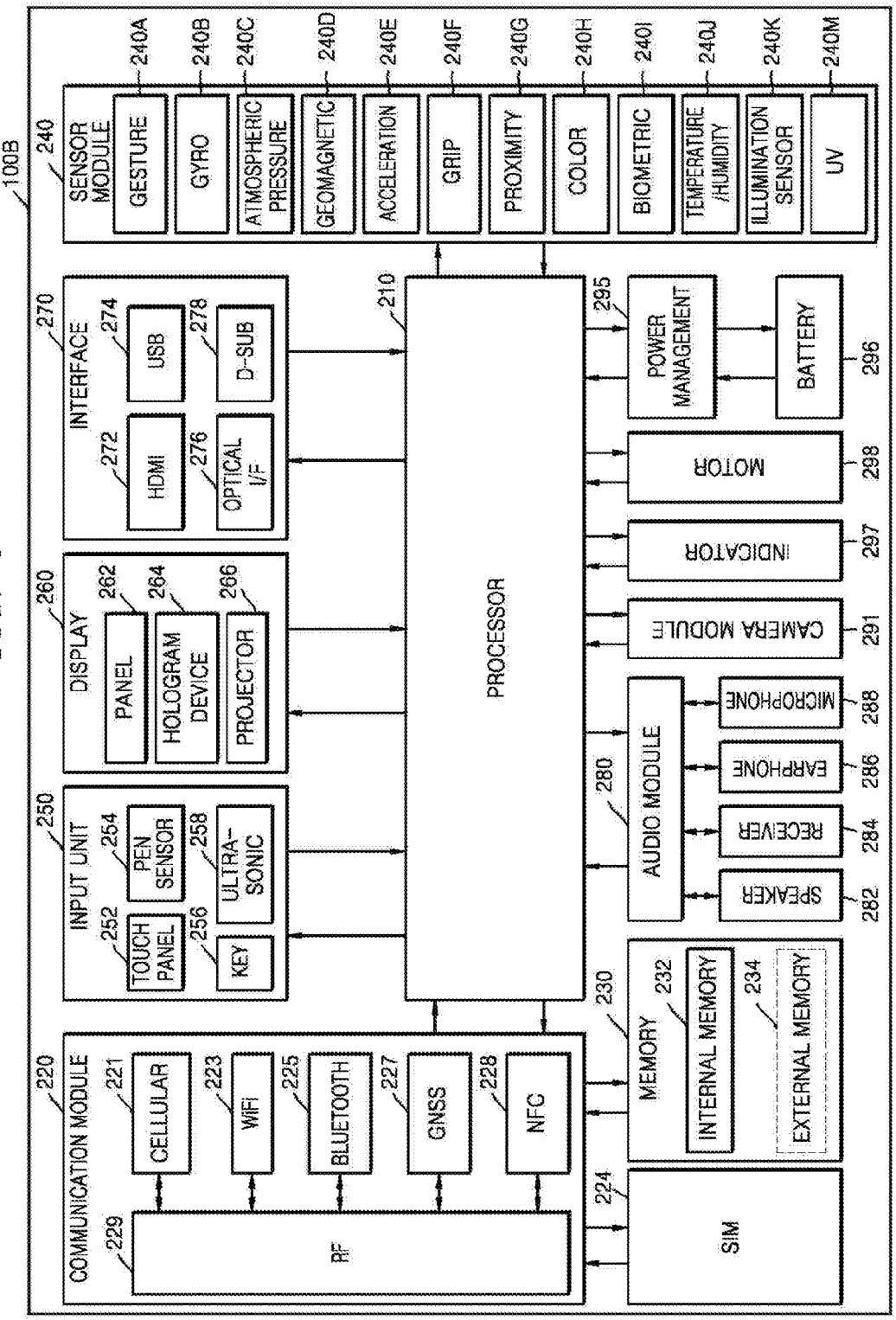
FIG. 3 is a block diagram illustrating an example device according to another example embodiment.

FIG. 3 is a block diagram illustrating an example device according to another example embodiment.

For example, the device 100B illustrated in FIG. 3 may include all or at least some of the device 100A illustrated in FIG. 2. The device 100B may include one or more processors 210, for example the CPU/DSP or an application processor, a communication module (e.g., including communication circuitry) 220, a subscriber identification module 224, a memory 230, a sensor module (e.g., including at least one sensor) 240, an input unit (e.g., including input circuitry) 250, a display 260, an interface 270, an audio module 280, a camera module 291, a power management module 295, a battery 296, an indicator 297, and a motor 298.

The processor 210 may control multiple hardware or software components connected to the processor 210 by executing an operating system or application programs, and perform various data processing and operations. The processor 210 may be implemented by a system on chip (SoC), for example. According to an example embodiment, the processor 210 may further include a graphic processing unit (GPU) and/or an image signal processor. The processor 210 may contain at least some of the components, e.g. a cellular module 221, illustrated in FIG. 3 therein. The processor 210 may load instructions or data received from at least one of the other components such as a non-volatile memory into a volatile memory and execute the instructions or data.

The communication module 220 may include various example communication circuitry, but is not limited to, the cellular module 221, a WiFi module 223, a Bluetooth module 225, a global navigation satellite system (GNSS) module 227 (e.g. a GPS module, a Glonass module, a Beidou module, or a Galileo module), a Near Field Communication (NFC) module 228, and a radio frequency (RF) module 229.

The cellular module 221 enables voice communication, video communication, messaging services, and Internet services of the device 100B through a communications network. For example, the cellular module 221 may perform identification and authentication of the device 100B in the communications network by using a subscriber identification module (SIM) 224. For another example, the cellular module 221 may perform at least some of the functions of the processor 210. As another example, the cellular module 221 may include a communication processor (CP).

Each of the WiFi module 223, the Bluetooth module 225, the GNSS module 227, and the NFC module 228 may include a processor for handling data transmitted or received through the module. One or more of the cellular module 221, the WiFi module 223, the Bluetooth module 225, the GNSS module 227, and the NFC module 228 may be contained in one integrated circuit (IC) chip or an IC package.

The RF module 229 may transmit and receive a RF communications signal. The RF module 229 may include, for example, a transceiver, a power amplifier module (PAM), a frequency filter, a low noise amplifier, and an antenna. As another example, at least one of the cellular module 221, the WiFi module 223, the Bluetooth module 225, the GNSS module 227, and the NFC module 228 may transmit and receive the RF signal through a separate RF module.

The subscriber identification module 224 may include a SIM card and/or an embedded SIM, and contain unique identification information such as an integrated circuit card identifier (ICCID) or subscriber information such as an international mobile subscriber identity (IMSI).

The memory 230 may include, for example, an internal memory 232 and an external memory 234. The internal memory 232 may include, for example, at least one of: a volatile memory such as a dynamic RAM (DRAM), a static RAM (SRAM), and a synchronous DRAM (SDRAM); a non-volatile memory such as a one time programmable ROM (OTPROM), a programmable ROM (PROM), an erasable programmable ROM (EPROM), an electrically erasable programmable ROM (EEPROM), a mask ROM, a flash ROM, a flash memory (e.g. a NAND flash or a NOR flash); a hard disk drive; and a solid state drive (SSD).

The external memory 234 may include, but is not limited to, a flash drive such as a compact flash (CF), a secure digital (SD), a micro secure digital (Micro-SD), a mini secure digital (Mini-SD), an extreme digital (xD), a multi-media card (MMC) and a memory stick. The external memory 234 may be connected to the device 100B functionally or physically through at least one of various interfaces.

The sensor module 240 may include various sensors that measure a physical quantity or sense an operation state of the device 100A and convert the measured or sensed information into an electrical signal. The sensor module 240 may include, for example, at least one of: a gesture sensor 240A, a gyro sensor 240B, an atmospheric pressure sensor 240C, a geomagnetic sensor 240D, an acceleration sensor 240E, a grip sensor 240F, a proximity sensor 240G, a color sensor 240H (e.g. a RGB sensor), a biometric sensor 240I, a temperature/humidity sensor 240J, an illumination sensor 240K, and an ultraviolet (UV) sensor 240M. Additionally or alternatively, the sensor module 240 may include, but is not limited to, an electronic noise sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors therein. For example, the device 100B may further include a processor for controlling the sensor module 240, as a part of the processor 210 or independently from the processor 210, so as to control the sensor module 240 when the processor 210 is in a sleep condition.

The input unit 250 may include various example input circuitry, but is not limited to, a touch panel 252, a pen sensor 254, a key 256, and an ultrasonic input unit 258. The touch panel 252 may be at least one of various types: capacitive, resistive, infrared beam, and surface acoustic wave, integral strain gauge, and piezoelectric types. The touch panel 252 may further include a control circuit. The touch panel 252 may further include a tactile layer to facilitate use with a tactile response.

The pen sensor 254 may be a part of the touch panel 252 or include a separate recognition sheet. The key 256 may include, but is not limited to, a physical button, an optical key, and a keypad. The ultrasonic input unit 258 may detect an ultrasonic signal from a source through a microphone (e.g. a microphone 288) and acquires data corresponding to the detected ultrasonic signal.

The display 260 may include a panel 262, a hologram device 264, and a projector 266. The panel 262 may be implemented, for example, to be flexible, transparent, or wearable. The panel 262 may be configured to be a single module along with the touch panel 252. The hologram device 264 may show a stereoscopic image in the air by using light interference phenomenon. The projector 266 may display an image by projecting light on a screen. The screen may be located in or outside the device 100B. According to an embodiment, the display 260 may further include a control circuit for controlling the panel 262, the hologram device 264, and the projector 266.

The interface 270 may include various example interface circuitry, for example, a high-definition multimedia interface (HDMI) 272, a universal serial bus (USB) interface 274, an optical interface 276, or a D-subminiature (D-sub) interface 278. Additionally or alternatively, the interface 270 may include, for example, a mobile high-definition link (MHL) interface, a secure digital (SD) card/multi-media card (MMC) interface, or an infrared data association (IrDA) interface.

The audio module 280 may convert a sound signal into an electrical signal or vice versa. The audio module 280 may process sound information that is input or output through a speaker 282, a receiver 284, an earphone 286, or a microphone 288.

The camera module 291 may acquire the still image and/or the moving picture, and include one or more image sensors (e.g. a front image sensor and a rear image sensor), lenses, an image signal processor (ISP), and a flash light (e.g. an LED lamp or a xenon lamp). When the camera module 291 includes a plurality of lenses, each of the lenses may have a view angle different from that of the other lenses or the same view angle as the others.

The power management module 295 may manage power consumption of the device 100B. According to an embodiment, the power management module 295 may include a power management integrated circuit (PMIC), a charger integrated circuit, or a battery or fuel gauge. The PMIC may enable charging of the battery 296 through a wired and/or wireless link. The wireless charging scheme may include, for example, a magnetic resonance type, a magnetic induction type, or an electromagnetic radiation type, and the power management module 295 may further include a coil loop, a resonator circuit, or a rectifier for the wireless charging. The battery gauge may measure, for example, a remaining battery power, a charging voltage, a charging current, or a temperature. The battery 296 may include, for example, a rechargeable battery and/or a solar battery.

The indicator 297 may indicate a specific state, e.g. a booting state, a message state, or a charging state, of the device 100B or a part thereof (e.g. the processor 210). The motor 298 may convert an electrical signal into mechanical vibrations or generate vibrations or haptic effects. Although not shown in FIG. 3, the device 100B may include a processor (e.g. a GPU) for supporting mobile television functionality. The processor for the mobile television functionality may process media data in accordance with digital multimedia broadcasting (DMB), digital video broadcasting (DVB), or the MediaFLO (trademark of Qualcomm Incorporated, San Diego, Calif., USA) standard.

Each of the elements described herein may be configured to be one or more components, and the name of the components may vary according to the type of device. In an embodiment, the device may include at least one of the elements described herein while some of the other elements are omitted or additional elements are further included. Also, some elements of the device according to an embodiment may be configured to be incorporated into a single entity that performs the same function as the elements before the incorporation thereof.

As described above with reference to FIGS. 1 through 3, the device 100, 100A, or 100B may include a plurality of cameras. Examples of the device 100, 100A, or 100B equipped with a plurality of cameras will now be described with reference to FIGS. 4A through 5B.

Figure 4A:
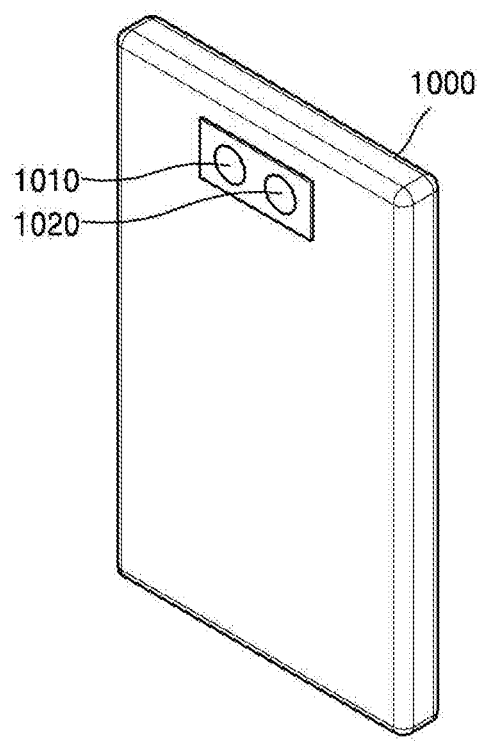
FIGS. 4A and 4B are diagrams illustrating an example of the device including a plurality of cameras, according to an example embodiment.
Figure 4B:
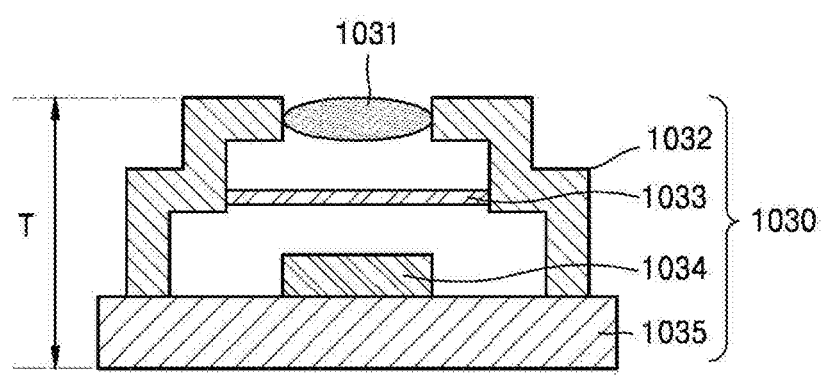

FIGS. 4A and 4B are diagrams illustrating an example of the device including a plurality of cameras, according to an example embodiment.

FIG. 4A illustrates an example of a device 1000 that includes a first camera 1010 and a second camera 1020. The device 1000 may correspond to one of the devices 100A and 100B described above with reference to FIGS. 2 and 3. For example, the device 1000 may be a camera, a smartphone, a tablet personal computer (PC), or a wearable device.

Each of the first camera 1010 and the second camera 1020 may generate an image containing an object. For example, the first camera 1010 generates a black-and-white image, and the second camera 1020 generates a color image.

The first camera 1010 and the second camera 1020 may be installed on a same surface of the device 1000 as each other so as to generate similar images containing the object. In other words, the first camera 1010 and the second camera 1020 may be disposed to face the same direction on one surface of the device 1000. Also, the first camera 1010 and the second camera 1020 may be disposed to be close to each other, so that the image generated by the first camera 1010 may represent the same object as the image generated by the second camera 1020.

The device 1000 may store specifications of the first camera 1010 and the second camera 1020 as well as positional relation between the first camera 1010 and the second camera 1020. In other words, information of relative positions of the first camera 1010 and the second camera 1020, focal lengths of the lenses in each of the cameras 1010 and 1020, sizes of the image sensors in each of the cameras 1010 and 1020 may be stored previously in the device 1000. Also, the first camera 1010 and the second camera 1020 may be arranged in such a manner that the horizontal axes or vertical axes of the cameras 1010 and 1020 may be aligned.

FIG. 4B illustrates an example of a configuration of a camera 1030. The camera 1030 of FIG. 4B may correspond to the first camera 1010 or the second camera 1020 illustrated in FIG. 4A. Although FIG. 4B only illustrates principal components of the camera 1030, those having ordinary skills in the art would appreciate that the camera 1030 may further include additional components for generating the image.

In the camera 1030, an image sensor 1034 is deposited on a substrate 1035, and an optical filter 1033 is installed above the image sensor 1034. For example, the image sensor 1034 may include a complementary metal-oxide semiconductor (CMOS) or a charge coupled device (CCD), or the like. A lens 1031 is installed above the optical filter 1033, and the relative positions of the lens 1031 and the image sensor 1034 may be fixedly maintained by a cover 1032.

The thickness "T" of the camera 1030 is determined by the thicknesses and positions of the lens 1031, the cover 1032, the optical filter 1033, the image sensor 1034, and the substrate 1035. In particular, the sizes and thicknesses of the lens 1031 and the image sensor 1034 are critical to the thickness "T" of the camera 1030. Thus, in order to reduce the thickness of the device 1000, it is desirable to make the sizes of the lens 1031 and the image sensor 1034 smaller and make the lens 1031 and the image sensor 1034 thinner. However, as the sizes of the lens 1031 and the image sensor 1034 get smaller and the lens 1031 and the image sensor 1034 get thinner, the quality of images generated by the camera 1030 deteriorate.

The device 1000 generates a new image representing the object by using a first image generated by the first camera 1010 and a second image generated by the second camera 1020. Here, the new image may have higher image quality than the first image and the second image. Therefore, even when the lens 1031 and the image sensor 1034 are small and thin, the device 1000 may generate and display high quality images.

Meanwhile, the camera 1030 may be a light field camera. The light field camera refers to a camera in which a plurality of photodiodes are connected to each of plural micro-lenses included in the image sensor 1034. In a general camera, the image sensor 1034 in the camera 1030 includes a plurality of micro-lenses, and a single photodiode is connected to each of the plurality of micro-lenses. In the light field camera, however, a plurality of photodiodes are connected to each of the micro-lenses, so that the camera generates a plurality of images for the same object but the viewpoints of the images are different from one another.

Meanwhile, assuming that the first camera 1010 is a camera generating the black-and-white image, the image sensor in the first camera 1010 may be a black-and-white image sensor. Also, assuming that the second camera 1020 is a camera generating the color image, the image sensor in the second camera 1020 may be a color image sensor. Here, the black-and-white image sensor in the first camera 1010 may have a greater number of pixels than the color image sensor in the second camera 1020. In such a case, the black-and-white image captured by the first camera 1010 may have a greater number of pixels than the color image captured by the second camera 1020. On the other hand, however, the black-and-white image sensor in the first camera 1010 may have a same number of pixels as the color image sensor in the second camera 1020. In such a case, the black-and-white image captured by the first camera 1010 may have the same number of pixels as the color image captured by the second camera 1020. Examples of the image sensors in the first camera 1010 and the second camera 1020 will now be described with reference to FIGS. 5A and 5B.

Figures 5A, 5B:
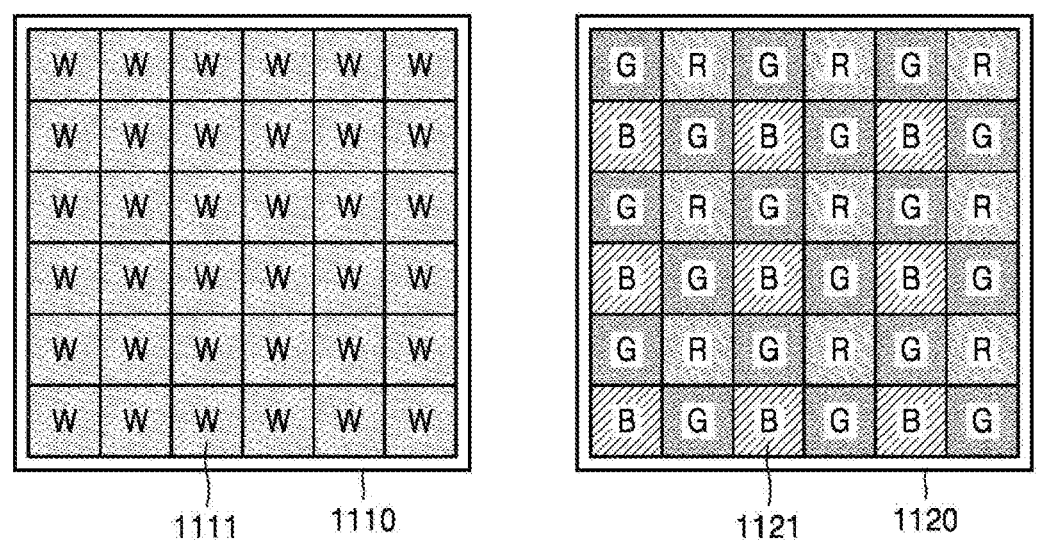

FIGS. 5A and 5B are diagrams illustrating examples of the image sensors in the cameras, according to an example embodiment.

FIG. 5A illustrates an example of a black-and-white image sensor 1110, and FIG. 5B illustrates an example of a color image sensor 1120. Each pixel 1111 in the black-and-white image sensor 1110 is used for determining a brightness level in white color based on the intensity of incident light. Meanwhile, each pixel 1121 in the color image sensor 1120 may represent one of three colors, red (R), green (G), and blue (B), and the color patterns for all the pixels are determined in advance. Thus, the pixel 1121 is used for determining, based on the intensity of the incident light, a brightness level in the color determined for the pixel in advance.

Examples of generating a new image in the device 1000 using the first image generated by the first camera 1010 and the second image generated by the second camera 1020 are described in greater detail below with reference to FIGS. 6 through 11.

Figure 6:
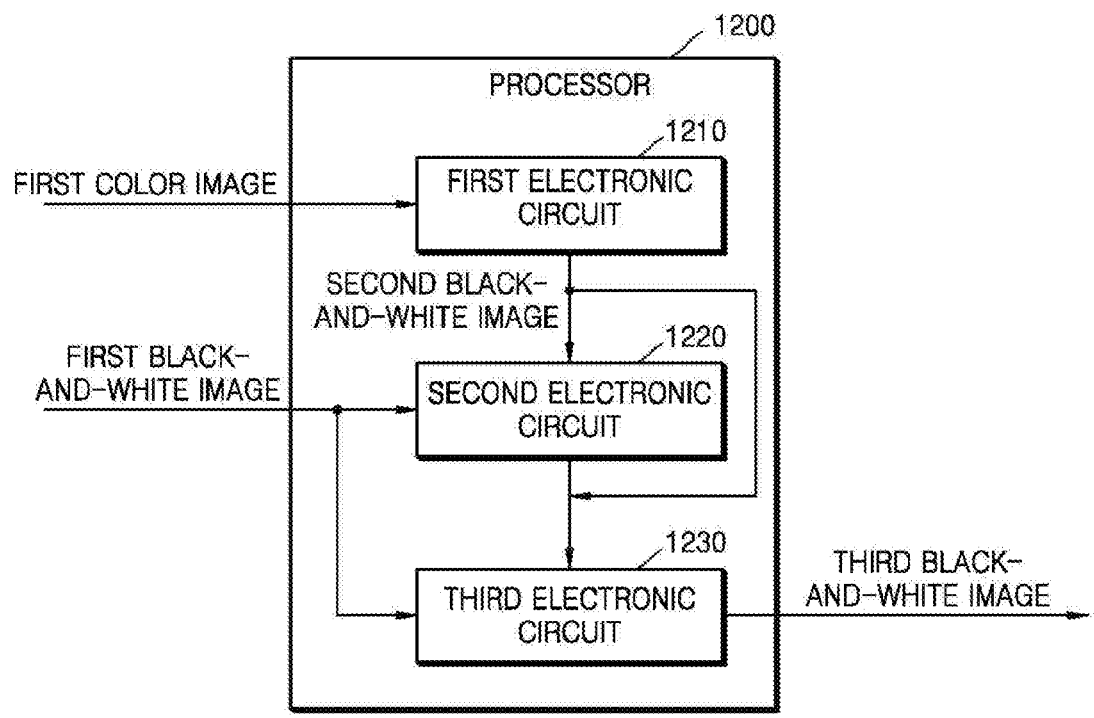
FIG. 6 is a block diagram illustrating an example processor according to an example embodiment.

FIG. 6 is a block diagram illustrating an example processor according to an example embodiment.

The processor 1200 illustrated in FIG. 6 includes a first electronic circuit 1210, a second electronic circuit 1220, and a third electronic circuit 1230. The processor 1200 may be implemented by an array of a plurality of logic gates, hardware circuitry or a combination of a general purpose microprocessor and a memory storing a program executable by the microprocessor. Also, those of ordinary skill in the art will appreciate that the processor 1200 may be implemented by another kind of hardware.

Although FIG. 6 depicts that the processor 1200 is divided into a plurality of electronic circuits 1210, 1220, and 1230 for convenience of description, a single electronic circuit may perform the functions of the electronic circuits 1210, 1220, and 1230 described below.

The first electronic circuit 1210 generates the second black-and-white image using the first color image. The first color image refers to a color image generated by the camera 1010 or 1020 in the device 1000. For example, assuming that the second camera 1020 is a camera configured to acquire color images, the first color image refers to the image acquired by the second camera 1020. The second black-and-white image is not an image acquired by the camera 1010 or 1020, but refers to an image generated by the first electronic circuit 1210 based on the first color image. For example, assuming that the first camera 1010 is a camera configured to acquire black-and-white images, the first black-and-white image refers to the image acquired by the first camera 1010 and the second black-and-white image refers to the image newly generated based on the first color image acquired by the second camera 1020.

The second black-and-white image generated by the first electronic circuit 1210 may have the same number of pixels as the first color image or the first black-and-white image. When the first electronic circuit 1210 generates the second black-and-white image, the first electronic circuit 1210 may determine a pixel value of each pixel in the second black-and-white image by using a color value of a corresponding pixel in the first color image or by using color values of the corresponding pixel and its neighboring pixels in the first color image.

In this description including the appended claims, the "color value" refers, for example, to a value representing information about the hue, the value (also referred to as 'lightness' or 'brightness'), and the chroma of a color. For example, the color value may be expressed by a RGB value which aggregately denotes the red, green, and blue components of a color. The "pixel value" of a pixel in a color image (e.g. the pixel 1311) may have the same meaning as the color value and may refer to a RGB value of the pixel. On the other hand, the "pixel value" of a pixel in a black-and-white image (e.g. the pixel 1321) may contain only the lightness component without the hue and chroma components, or may have the same format as the color value with the hue and chroma components of zero values.

Figure 7:
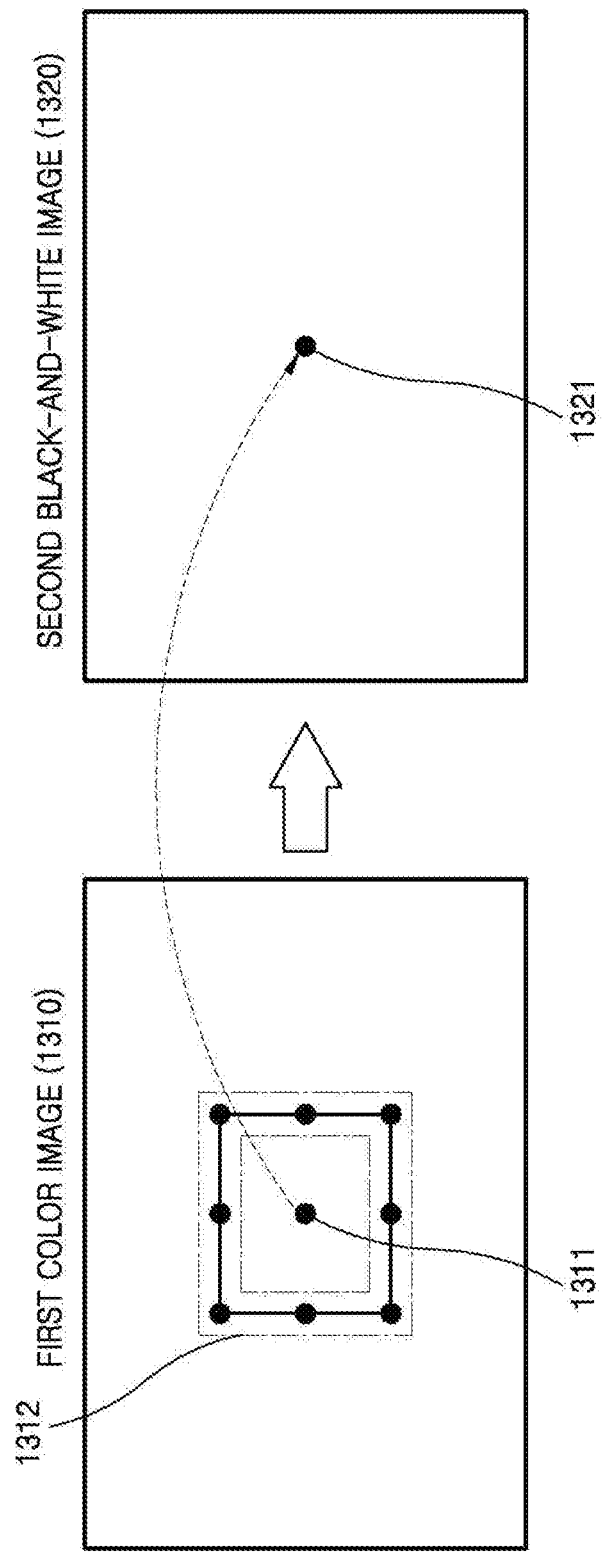
FIG. 7 is a diagram illustrating an example of generating a second black-and-white image performed by a first electronic circuit, according to an example embodiment.

FIG. 7 is a diagram illustrating an example of the generation of the second black-and-white image that is performed by the first electronic circuit 1210.

Referring to FIG. 7, the first electronic circuit 1210 may determine the pixel value of the pixel 1321 in the second black-and-white image 1320 using the pixel value of the pixel 1311 in the first color image 1310. Here, the pixel 1321 is a pixel in the second black-and-white image 1320 that corresponds to the pixel 1311 in the first color image 1310. For example, the pixel 1321 may be a pixel representing the same portion of an object as the pixel 1311 in the first color image 1310.

The first electronic circuit 1210 may acquire the hue and lightness information of the pixel 1311 from the color value of the pixel 1311. The first electronic circuit 1210 may determine the pixel value of the pixel 1321 in the second black-and-white image 1320 by using the lightness value of the pixel 1311. For example, the first electronic circuit 1210 may determine the lightness value of the pixel 1311 as the pixel value of the pixel 1321 in the second black-and-white image 1320.

On the other hand, the first electronic circuit 1210 may determine the pixel value of the pixel 1321 in the second black-and-white image 1320 by taking the pixel values of neighboring pixels 1312 of the pixel 1311 into account in addition to the pixel 1311 itself. In this case, the first electronic circuit 1210 may give weights to each of the neighboring pixels 1312 according to distances from the pixel 1311 to each of the neighboring pixels 1312. For example, a smaller weight may be given for a neighboring pixel spaced apart from the pixel 1311 by a greater distance.

Although eight pixels are depicted as the neighboring pixels 1321 of the pixel 1311 in FIG. 7, the number of the neighboring pixels is not limited thereto. In other words, more than eight pixels neighboring the pixel 1311 may be used for determining the pixel value of the pixel 1321 corresponding to the pixel 1311. Also, only some of the eight pixels (e.g. four pixels adjacent to the pixel 1311) may be used for determining the pixel value of the pixel 1321.

Referring back to FIG. 6, the second electronic circuit 1220 acquires the information representing positional relationships between the pixels in the first black-and-white image and the pixels in the second black-and-white image. For example, the second electronic circuit 1220 may identify a pixel in the first black-and-white image that corresponds to each pixel in the second black-and-white image.

Figure 8:
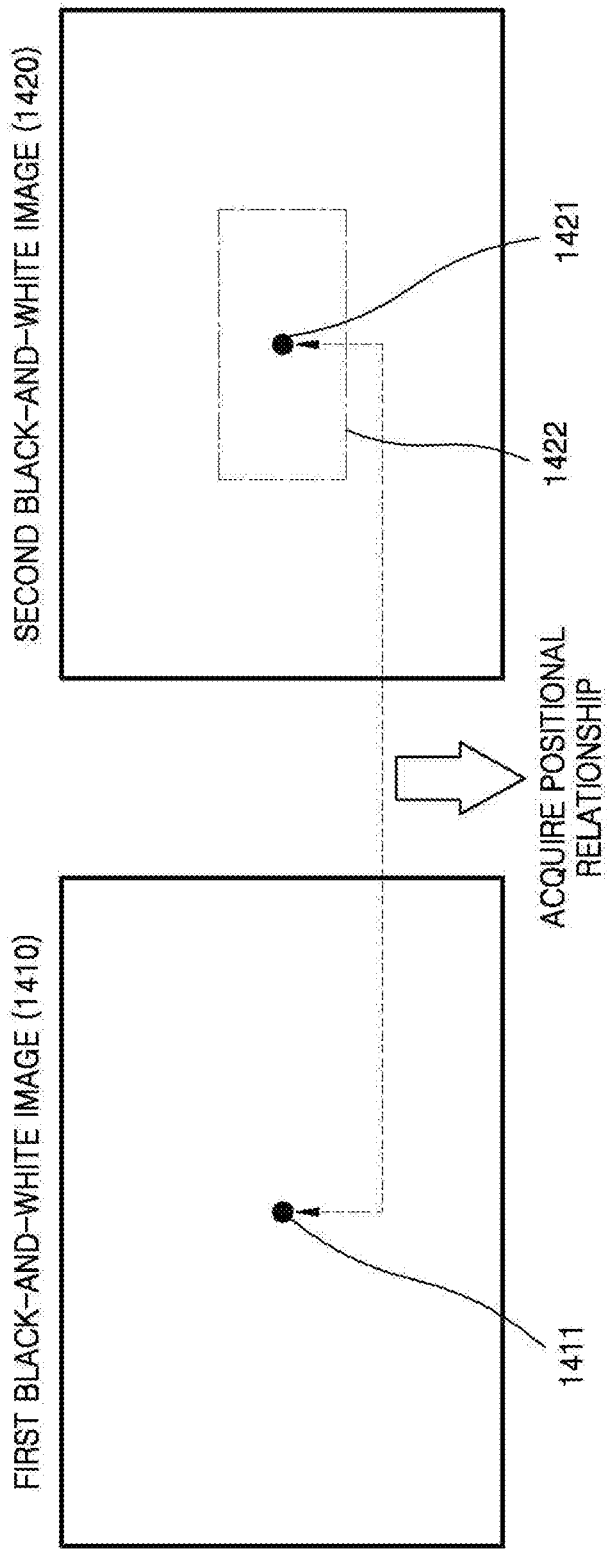
FIG. 8 is a diagram illustrating an example of an operation of a second electronic circuit, according to an example embodiment.

FIG. 8 is a diagram illustrating an example of the operation of the second electronic circuit 1220, according to an example embodiment.

Referring to FIG. 8, the second electronic circuit 1220 acquires the information representing positional relationships between the pixels in the first black-and-white image 1410 and the pixels in the second black-and-white image 1420. In other words, the second electronic circuit 1220 may identify a pixel 1421 in the second black-and-white image 1420 that corresponds to a pixel 1411 in the first black-and-white image 1410.

According to an embodiment, the second electronic circuit 1220 may identify the pixel 1421 in the second black-and-white image 1420 that represents the same information as the pixel 1411 in the first black-and-white image 1410 by using the specification of the first camera 1010, that of the second camera 1020, and the positional relationship between the first and second cameras 1010 and 1020. In detail, the second electronic circuit 1220 may identify the pixel 1421 based on the distance between the first and second cameras 1010 and 1020, the focal lengths of the lenses in the first and second cameras 1010 and 1020, and the sizes of the image sensors in the first and second cameras 1010 and 1020.

According to another embodiment, the second electronic circuit 1220 may identify the pixel 1421 in the second black-and-white image 1420 based on correlations between the pixel values of the pixels in the first black-and-white image 1410 and the pixel values of the pixels in the second black-and-white image 1420. In detail, the second electronic circuit 1220 may determine a correlation value between the pixel value of the pixel 1411 and the pixel value of each of the pixels in the second black-and-white image 1420. Then, the second electronic circuit 1220 may determine a pixel having a highest correlation value among the pixels in the second black-and-white image 1420 as the pixel 1421 corresponding to the pixel 1411.

According to yet another embodiment, the second electronic circuit 1220 may extract feature points from the first black-and-white image 1410 and the second black-and-white image 1420 and then match the feature points to identify the pixel 1421 by using a result of the matching. The extraction of feature points from images and the matching of the feature points to find mapping information between the images may be apparent to those of ordinary skill in the art and will not be described in detail here.

On the other hand, the second electronic circuit 1220 may identify the pixel 1421 corresponding to the pixel 1411 by combining two or more methods described above. For example, the second electronic circuit 1220 may choose a candidate area 1422 in the second black-and-white image 1420 using the specifications of the first and second cameras 1010 and 1020 and the positional relationship between the first and second cameras 1010 and 1020, and determine correlation values between the pixel value of the pixel 1411 and each of the pixels in the chosen candidate area 1422 to identify the pixel 1421 by the correlation values.

Referring back to FIG. 6, the third electronic circuit 1230 generates the third black-and-white image based on the first black-and-white image, the second black-and-white image, and the information acquired by the second electronic circuit 1220. The third black-and-white image may have the same number of pixels as the first black-and-white image, or may have more pixels than the first black-and-white image.

For example, the third electronic circuit 1230 searches for a pixel in the second black-and-white image 1420 (referred to hereinafter as "second pixel") corresponding to a pixel in the first black-and-white image 1410 (referred to hereinafter as "first pixel") by using the information acquired by the second electronic circuit 1220. Then, the third electronic circuit 1230 determines the pixel value of a pixel in the third black-and-white image (referred to hereinafter as "third pixel") by using the pixel values of the first and second pixels.

Also, the third electronic circuit 1230 may determine the pixel value of the third pixel taking into account the pixel values of the pixels neighboring the first and second pixels in addition to the first and second pixels themselves. For example, the third electronic circuit 1230 may determine the pixel value of the third pixel by determining a weighted average of the pixel values of the first pixel, the second pixel, and the pixels adjacent to the first and second pixels.

There may be differences in average brightness, contrast level, amount of burs, and amount of noises between the first black-and-white image and the second black-and-white image.

In a case where the first black-and-white image and the second black-and-white image differ from each other only in the amount of noise, for example, the third electronic circuit 1230 may determine a patch pi including the third pixel according to equation 1.

$$p_i = \frac{1}{w_1 + w_2}(w_1 p_i' + w_2 p_i'') \qquad (1)$$

In the equation 1, $p_i'$ denotes a patch in which the first pixel and the pixels neighboring the first pixels are aggregated, $p_i''$ denotes a patch in which the second pixel and the pixels neighboring the second pixels are aggregated. In case that the number of pixels of the first black-and-white image is different from that of the second black-and-white image or the number of pixels of the third black-and-white image is different from that of the first black-and-white image or the second black-and-white image, the patches pi' and pi'' may be defined by interpolation of pixel values.

'$w_1$' denotes a weight determined according to noise in the first image (or the patch $p_i$), and '$w_2$' denotes a weight determined according to noise in the second image (or the patch pi). Also, $w_1$ and $w_2$ have a relationship of: $w_1 + w_2 = 1$. If positions of the patches $p_i'$ and $p_i''$ do not coincide with each other due to view angles of the first camera 1010 and the second camera 1020, the third electronic circuit 1230 applies a value close to or equal to zero to '$w_1$'. In this case, the weight of $p_i'$ may be ignored or reduced compared to that of $p_i''$.

In a case where the first black-and-white image and the second black-and-white image differ from each other in an average brightness and contrast in addition to the difference in the amount of noise, as another example, the third electronic circuit 1230 may determine the patch $p_i$ which includes the third pixel according to equation 2.

$$p_i = \frac{1}{w_1 + w_2}(w_1 p_i' + w_2(a_i p_i'' + b_i)) \qquad (2)$$

In the equation 2, '$a_i$' and '$b_i$' are variables defined to equalize the average brightness and contrast of the patch $p_i'$ to the patch $p_i''$, and may be a scalar value. For example, the third electronic circuit 1230 may determine the variables ai and bi according to equations 3 and 4.

$$a_i = \frac{\sigma(p_i')}{\sigma(p_i'')} \qquad (3)$$

$$b_i = \mu(p_i') - a_i \mu(p_i'') \qquad (4)$$

In the equations 3 and 4, $\mu(p_i')$ denotes an average of pixel values of pixels included in the patch $p_i'$, and $\sigma(p_i')$ denotes a standard deviation of the pixel values of the pixels included in the patch $p_i'$. Also, $\mu(p_i'')$ denotes an average of pixel values of pixels included in the patch $p_i''$, and $\sigma(p_i'')$ denotes a standard deviation of the pixel values of the pixels included in the patch $p_i''$.

According to the above embodiments, the third electronic circuit 1230 may generate the third black-and-white image having a higher picture quality than the first black-and-white image.

Figure 9:
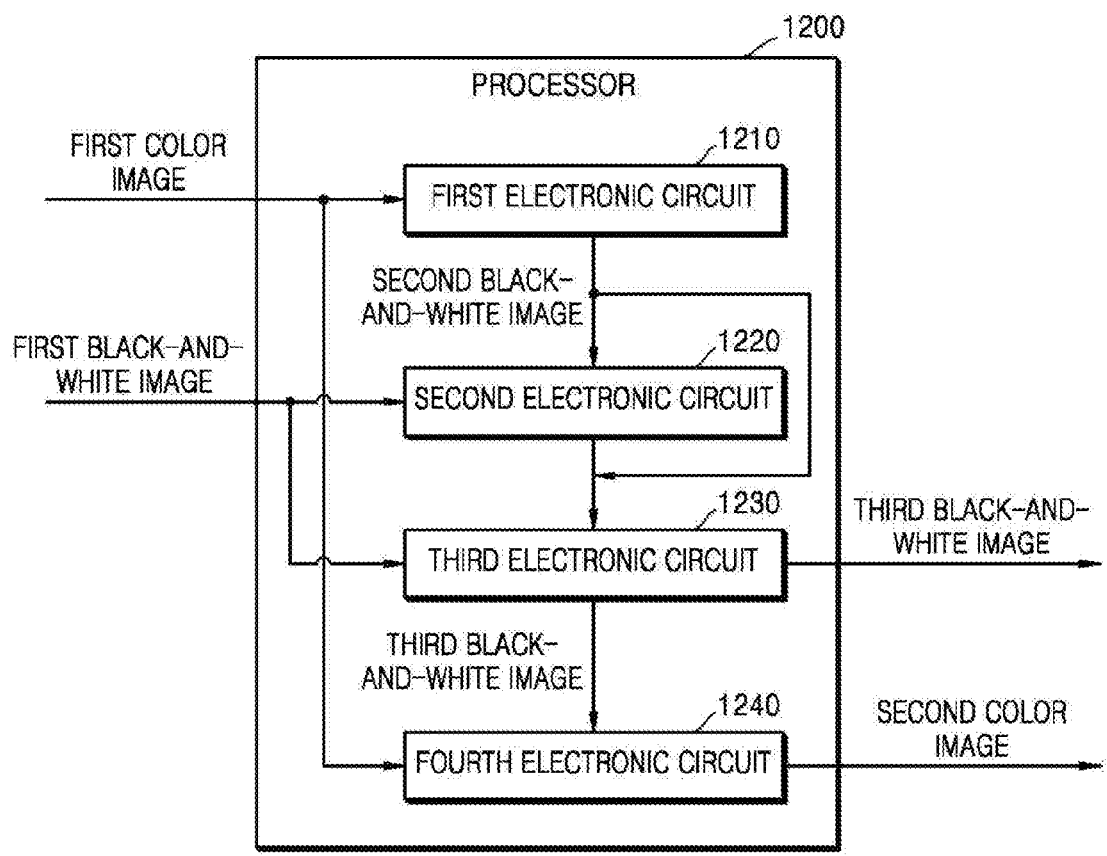
FIG. 9 is a block diagram illustrating an example processor according to another example embodiment.

FIG. 9 is a block diagram illustrating an example processor according to another example embodiment.

Referring to FIG. 9, a processor 1201 includes the first electronic circuit 1210, the second electronic circuit 1220, the third electronic circuit 1230, and a fourth electronic circuit 1240. The processor 1201 may be implemented by an array of a plurality of logic gates, hardware circuitry or a combination of a general purpose microprocessor and a memory storing a program executable by the microprocessor. Also, those of ordinary skill in the art will appreciate that the processor 1201 may be implemented by another kind of hardware.

Although FIG. 9 depicts that the processor 1201 is divided into a plurality of electronic circuits 1210, 1220, 1230, and 1240 for convenience of description, a single electronic circuit may perform the functions of the electronic circuits 1210, 1220, 1230, and 1240 described below. Also, the functions of the first electronic circuit 1210, the second electronic circuit 1220, and the third electronic circuit 1230 may be the same as those described above with reference to FIG. 6 through 8. Thus, descriptions of the first electronic circuit 1210, the second electronic circuit 1220, and the third electronic circuit 1230 are omitted here.

The fourth electronic circuit 1240 generates a second color image using the first color image and the third black-and-white image. Here, the number of pixels included in the second color image may be the same as the number of pixels in the third black-and-white image.

The fourth electronic circuit 1240 may determine a color value of each of the pixels in the third black-and-white image by using color values of the pixels in the first color image. For example, the fourth electronic circuit 1240 may determine the color value of a pixel in the second color image (referred to hereinafter as "fifth pixel") by using a color value of a pixel in the first color image (referred to hereinafter as "fourth pixel") and at least one weight. Here, the at least one weight may be determined based on the first color image or the third black-and-white image. The fifth pixel refers to a pixel in the second color image that corresponds to the fourth pixel in the first color image.

For example, the fourth electronic circuit 1240 may determine the color value of the fifth pixel based on an equation 5.

$$c'_i = \frac{1}{w_i} \sum_{j \in N(i)} w^s_{ij} w^m_{ij} w^c_{ij} c_j \quad (5)$$

In the equation 5, '$c_i$' denotes the color value of the fifth pixel, i.e. an i-th pixel in the second color image. For example, '$c_i$' may be the value of one color among the red (R), green (G), and blue (B) colors. N(i) denotes a set of the fifth pixel and neighboring pixels of the fifth pixel. The number of pixels included in the set N(i) may be determined in advance. '$w_i$' denotes a normalization factor and may be defined by $\Sigma_{j \in N(i)} w^s_{ij} w^m_{ij} w^c_{ij} c_j$.

Also, '$c_j$' denotes the color value of the fourth pixel, i.e. a j-th pixel in the first color image. In a case where the size of or the number of pixels of the first color image is different from that of the second color image, '$c_j$' may not be the j-th pixel in the first color image but may be the other pixel in the first color image corresponding to a j-th pixel in the second color image.

'$w^s_{ij}$' denotes a weight for a distance between pixels and may be determined by an equation 6, for example.

$$w^s_{ij} = \exp\left(-\frac{d(i,j)^2}{2\sigma^2_s}\right) \quad (6)$$

In the equation 6, d(i, j) denotes a distance between an i-th pixel and j-th pixel in the image, and may be a Euclidean distance between the pixels. Also, σs denotes a parameter for adjusting the change of the weight according to the distance between the pixels and may be determined in advance according to the distance between the pixels.

'$w^m_{ij}$' denotes a weight based on the third black-and-white image and may be determined by an equation 7, for example.

$$w^m_{ij} = \exp\left(-\frac{|m_i - m_j|^2}{2\sigma^2_m}\right) \quad (7)$$

In the equation 7, '$m_i$' denotes a pixel value of an i-th pixel in the third black-and-white image, and '$m_j$' denotes a pixel value of a j-th pixel in the third black-and-white image. Also, σm denotes a parameter for adjusting the change of the weight according to the difference in pixel values between the pixels in the third black-and-white image and may be determined in advance according to the difference in the pixel values. When the difference in pixel value between the i-th pixel and the j-th pixel is small, the weight '$w^m_{ij}$' makes the color values of the i-th pixel and the j-th pixel approach each other under an assumption that a surface containing the i-th pixel and the j-th pixel is a small surface with little color change. Contrarily, when a difference in pixel value between the i-th pixel and the j-th pixel is large, the weight '$w^m_{ij}$' maintains the difference in the color value between the i-th pixel and the j-th pixel.

'$w^c_{ij}$' denotes a weight based on the first color image and may be determined by an equation 8 or 9, for example.

$$w^c_{ij} = \exp\left(-\frac{|c_i - c_j|^2}{2\sigma^2_c}\right) \quad (8)$$

The equation 8 expresses the weight '$w^c_{ij}$' when both the color values ci and cj exist. Also, σc denotes a parameter for adjusting the change of the weight according to the difference in pixel values between the pixels in the first color image and may be determined in advance according to the difference in the pixel values.

$$w^c_{ij} = C \quad (9)$$

The equation 9 expresses the weight '$w^c_{ij}$' when the color value ci or cj does not exist. As described above with reference to FIG. 4B, the optical filter 1033 is installed above the image sensor 1034. If the camera 1030 is a color camera, the optical filter 1033 is a color filter and the image sensor 1034 is a color image sensor. Thus, each of the pixels in the image sensor 1034 may or may not contain a certain color component. For example, assuming that a certain pixel in the image sensor 1034 is configured to receive a red light and generate a red component signal, the pixel value for the pixel may or may not contain the red component. When either the color value ci or the value cj does not exist, it is impractical to determine the weight '$w^c_{ij}$' by using the equation 8. Thus, the weight '$w^c_{ij}$' is determined to be a predetermined constant C in such a case.

According to the above embodiment, the fourth electronic circuit 1240 may generate the second color image having a higher picture quality than the first color image by using the first color image and the third black-and-white image.

Figure 10:
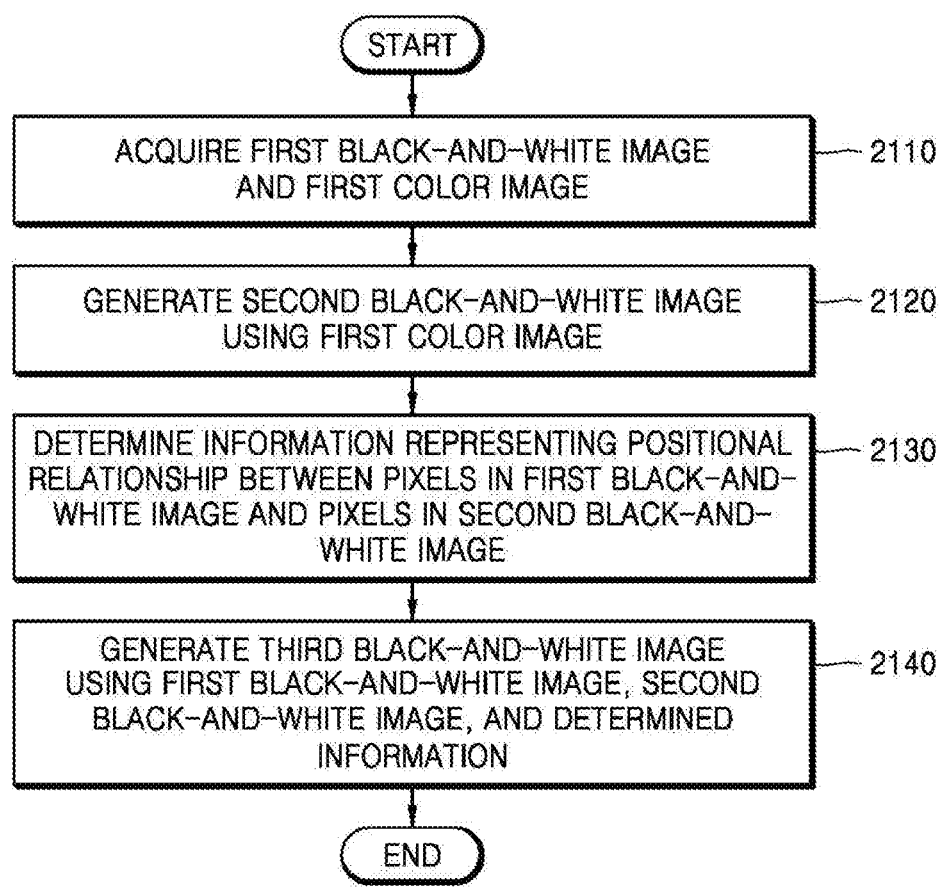
FIG. 10 is a flowchart illustrating an example method of generating an image, according to an example embodiment.

FIG. 10 is a flowchart illustrating an example method of generating an image according to an example embodiment.

Referring to FIG. 10, the method of generating an image includes operations performed in time series by the devices 100, 100A, 1006, or 1000 illustrated in FIG. 1 through FIG. 4 or the processor 1200 or 1201 illustrated in FIGS. 6 and 9. Thus, the description provided above regarding the devices 100, 100A, 1006, or 1000 illustrated in FIG. 1 through FIG. 4 or the processor 1200 or 1201 illustrated in FIGS. 6 and 9 are applicable to the method illustrated in FIG. 10.

In operation 2110, the device 100, 100A, 1006, or 1000 acquires the first black-and-white image and the first color image. For example, the device 100 may include a first camera generating the first black-and-white image and a second camera generating the first color image. Also, each of the first and second cameras may be a light field camera. The light field camera refers to a camera in which a plurality of photodiodes are connected to each of a plurality of microlenses included in the image sensor.

In operation 2120, the first electronic circuit 1210 generates the second black-and-white image using the first color image. The second black-and-white image generated by the first electronic circuit 1210 may have the same number of pixels as the first color image or the first the black-and-white image.

In operation 2130, the second electronic circuit 1220 determines information representing positional relationships between pixels in the first black-and-white image and pixels in the second black-and-white image. In other words, the second electronic circuit 1220 identifies a pixel 1421 in the second black-and-white image that corresponds to each of the pixels in the first black-and-white image.

In operation 2140, the third electronic circuit 1230 generates the third black-and-white image based on the first black-and-white image, the second black-and-white image, and the information determined by the second electronic circuit 1220. The third black-and-white image may have the same number of pixels as the first black-and-white image or a larger number of pixels than the first black-and-white image.

Figure 11:
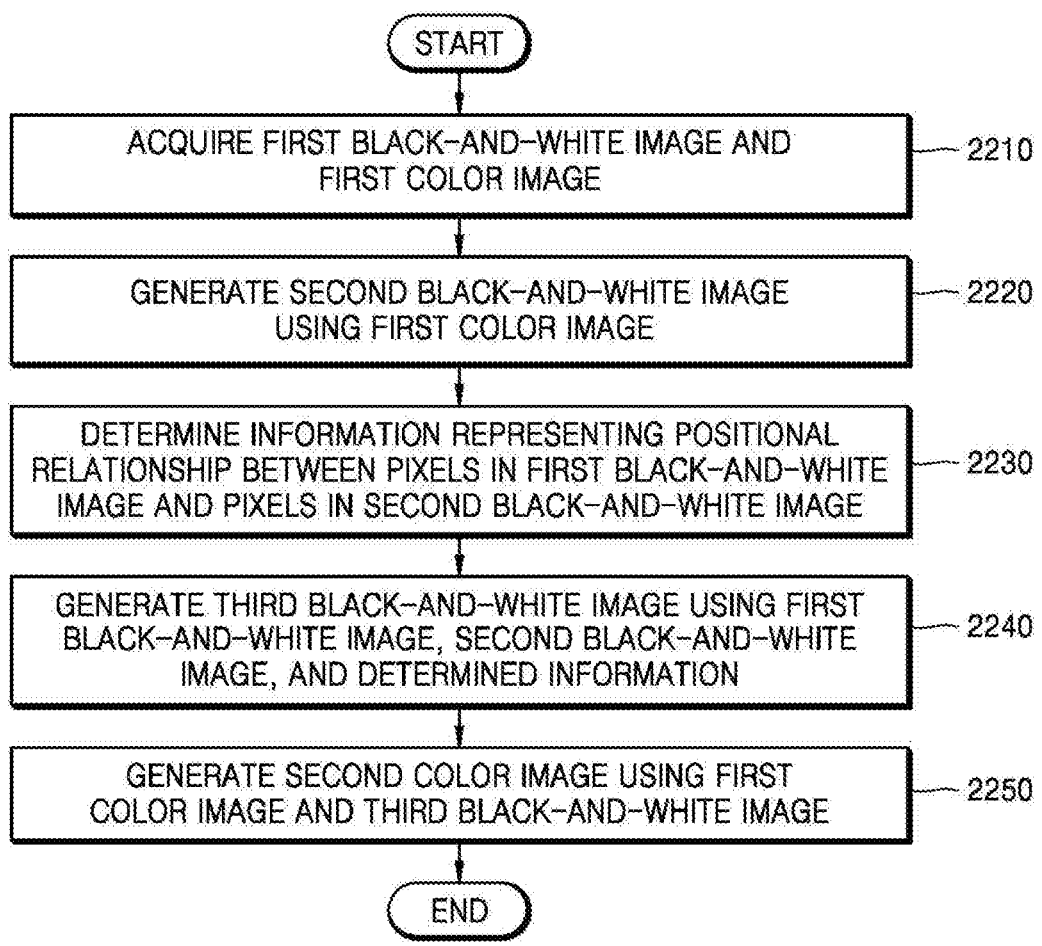
FIG. 11 is a flowchart illustrating an example method of generating an image, according to another example embodiment.

FIG. 11 is a flowchart illustrating an example method of generating an image, according to another example embodiment.

Referring to FIG. 11, the method of generating an image includes operations performed in time series by the devices 100, 100A, 1006, or 1000 illustrated in FIG. 1 through FIG. 4 or the processor 1200 or 1201 illustrated in FIGS. 6 and 9. Thus, the description provided above regarding the devices 100, 100A, 1006, or 1000 illustrated in FIG. 1 through FIG. 4 or the processor 1200 or 1201 illustrated in FIGS. 6 and 9 are applicable to the method illustrated in FIG. 11.

Also, the operations 2210 through 2240 illustrated in FIG. 11 may be the same as respective operations in FIG. 10. Thus, detailed description of the operations 2210 through 2240 will be omitted here.

In operation 2250, the fourth electronic circuit 1240 generates the second color image by using the first color image and the third black-and-white image. The number of pixels in the second color image may be the same as the number of pixels in the third black-and-white image.

The device described above may generate a high quality image in which bright noise and color noise are reduced by using both a color image and a black-and-white image.

The method described above may be written into a computer-readable program, stored in a non-transitory computer-readable storage medium, and implemented in a general-purpose digital computer executing the program by use of the non-transitory computer-readable storage medium. Also, the data structure used in the above method may be stored in the non-transitory computer-readable storage medium by various recording devices. The non-transitory computer-readable storage medium may be any kind of recording device which stores computer-readable data. Examples of the non-transitory computer-readable storage medium include ROMs, RAMs, magnetic storage media such as magnetic tapes, floppy disks, and hard disks, and optical recording media such as CD-ROMs and DVD-ROMs.

Also, the method described above may be performed by an execution of instructions contained in at least one program among programs maintained in the non-transitory computer-readable storage medium. When the instructions are executed by a computer, the computer may perform the function corresponding to the instructions. Here, the instructions may include machine code that may be directly executed by the processing device, such as machine code produced by a compiler, and/or higher-level code that may be executed by the processing device using an interpreter. In this disclosure, an example of the computer may be a processor, and an example of the recording medium may be a memory.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A device comprising:
a first camera configured to acquire a first black-and-white image;
a second camera configured to acquire a first color image;
a first electronic circuit configured to generate a second black-and-white image using the first color image;
a second electronic circuit configured to determine information representing positional relationships between pixels in the first black-and-white image and pixels in the second black-and-white image; and
a third electronic circuit configured to generate a third black-and-white image based on the first black-and-white image, the second black-and-white image, and the determined information.

2. The device of claim 1, wherein a number of pixels of a first image sensor in the first camera is greater than or equal to a number of pixels of a second image sensor in the second camera.

3. The device of claim 1, wherein the first electronic circuit is configured to determine a pixel value of a second pixel in the second black-and-white image using a pixel value of a first pixel in the first color image, wherein the second pixel in the second black-and-white image corresponds to the first pixel in the first color image.

4. The device of claim 3, wherein the first electronic circuit is configured to determine the pixel value of the second pixel taking into account pixel values of neighboring pixels of the first pixel.

5. The device of claim 1, wherein the third electronic circuit is configured to search for a fourth pixel in the second black-and-white image corresponding to a third pixel in the first black-and-white image using the determined information, and to determine a pixel value of a fifth pixel in the third black-and-white image using pixel values of the third and fourth pixels.

6. The device of claim 5, wherein the third electronic circuit is configured to determine the pixel value of the fifth pixel taking into account pixel values of neighboring pixels of the third pixel and pixel values of neighboring pixels of the fourth pixel.

7. The device of claim 1, further comprising:
a fourth electronic circuit configured to generate a second color image using the first color image and the third black-and-white image.

8. The device of claim 7, wherein the fourth electronic circuit is configured to determine a color value of a seventh pixel in the second color image using a color value of a sixth pixel in the first color image and at least one weight that is based on the first color image or the third black-and-white image,
wherein the second pixel in the second color image corresponds to the sixth pixel in the first color image.

9. The device of claim 1, wherein each of the first and second cameras comprises a light field camera.

10. A method of generating an image, the method comprising:
acquiring a first black-and-white image and a first color image;
generating a second black-and-white image using the first color image;
determining information representing positional relationships between pixels in the first black-and-white image and pixels in the second black-and-white image; and
generating a third black-and-white image based on the first black-and-white image, the second black-and-white image, and the determined information.

11. The method of claim 10, wherein a number of pixels of a first image sensor in a first camera is greater than or equal to a number of pixels of a second image sensor in a second camera.

12. The method of claim 10, wherein the generating of the second black-and-white image comprises:
determining a pixel value of a second pixel in the second black-and-white image using a pixel value of a first pixel in the first color image,
wherein the second pixel in the second black-and-white image corresponds to the first pixel in the first color image.

13. The method of claim 12, wherein the generating of the second black-and-white image comprises:
determining the pixel value of the second pixel taking into account pixel values of neighboring pixels of the first pixel.

14. The method of claim 10, wherein the generating of the third black-and-white image comprises:
searching for a fourth pixel in the second black-and-white image corresponding to a third pixel in the first black-and-white image using the determined information; and
determining a pixel value of a fifth pixel in the third black-and-white image using pixel values of the third and fourth pixels.

15. The method of claim 14, wherein the determining of the pixel value of the fifth pixel comprises:
determining the pixel value of the fifth pixel taking into account pixel values of neighboring pixels of the third pixel and pixel values of neighboring pixels of the fourth pixel.

16. The method of claim 10, further comprising:
generating a second color image using the first color image and the third black-and-white image.

17. The method of claim 16, wherein the generating of the second color image comprises:
determining a color value of a seventh pixel in the second color image using a color value of a sixth pixel in the first color image and at least one weight that is based on the first color image or the third black-and-white image,
wherein the second pixel in the second color image corresponds to the sixth pixel in the first color image.

18. The method of claim 10, wherein a first camera generates the first black-and-white image and a second camera generates the first color image, and each of the first camera and the second camera comprises a light field camera.

19. A non-transitory computer-readable storage medium having stored therein program instructions which, when executed by a computer, perform the method of claim 10.

* * * * *